(12) United States Patent
Mills et al.

(10) Patent No.: US 7,249,595 B2
(45) Date of Patent: Jul. 31, 2007

(54) VAPOR VENT VALVE WITH PRESSURE RELIEF FUNCTION INTEGRATED TO CARBON CANISTER

(75) Inventors: Vaughn K. Mills, Chelsea, MI (US); Andrew W. McIntosh, Ann Arbor, MI (US)

(73) Assignee: Eaton Corporation, Cleveland, OH (US)

( * ) Notice: Subject to any disclaimer, the term of this patent is extended or adjusted under 35 U.S.C. 154(b) by 310 days.

(21) Appl. No.: 11/081,418

(22) Filed: Mar. 16, 2005

(65) Prior Publication Data

US 2006/0207576 A1 Sep. 21, 2006

(51) Int. Cl.
*F02M 33/02* (2006.01)

(52) U.S. Cl. .................. 123/516; 123/518; 123/519

(58) Field of Classification Search ............... 123/516, 123/518, 519, 520
See application file for complete search history.

(56) References Cited

U.S. PATENT DOCUMENTS

| | | | |
|---|---|---|---|
| 4,655,238 A * | 4/1987 | Szlaga | .................. 137/43 |
| 5,004,002 A | 4/1991 | Kobayashi | |
| 5,183,087 A | 2/1993 | Aubel et al. | |
| 5,450,833 A | 9/1995 | Denz et al. | |
| 5,666,989 A | 9/1997 | Roetker | |
| 5,687,778 A * | 11/1997 | Harris | .................. 141/59 |
| 5,730,107 A * | 3/1998 | Blumenstock | .............. 123/520 |
| 5,749,347 A | 5/1998 | Torii | |
| 5,983,958 A | 11/1999 | Bergsma et al. | |
| 5,992,396 A * | 11/1999 | Krimmer et al. | ............ 123/519 |
| 6,176,259 B1 * | 1/2001 | Harde et al. | .................. 137/587 |
| 6,343,590 B1 | 2/2002 | Nagai et al. | |
| 7,047,951 B2 * | 5/2006 | Rado | .................. 123/518 |
| 2006/0231138 A1 * | 10/2006 | Devall | .................. 137/202 |

FOREIGN PATENT DOCUMENTS

FR 2 686 840 A 8/1993

OTHER PUBLICATIONS

EP Search Report, EP 06004809.7-2422 search completed Jun. 26, 2006.

* cited by examiner

*Primary Examiner*—Thomas Moulis
(74) *Attorney, Agent, or Firm*—Anna M. Shih

(57) ABSTRACT

A combination fuel vapor storage canister and vapor vent/tipping valve in a common housing with ports for connection to a fuel tank, a purge line and an atmospheric vent. The vapor vent/tipping valve includes a pressure relief valve which prevents vapor venting until a predetermined vapor pressure is reached; and, the pressure relief valve may also include a vacuum relief valve.

19 Claims, 2 Drawing Sheets

VAPOR VENT VALVE WITH PRESSURE RELIEF FUNCTION INTEGRATED TO CARBON CANISTER

BACKGROUND

In small engines of less than 50 horsepower (37.2 kilowatts) such as those employed for garden tractors, lawn mowers, portable generating sets and marine applications it has recently been mandated that such engines be equipped with fuel vapor emission controls.

Small engines used for such applications commonly have the fuel tank disposed approximate the engine for facilitating engine installation on the appliance employing the engine. The more widely used configuration utilizes a gravity feed fuel supply from the tank to the engine carburetor; however, in certain applications on engines approaching 50 horsepower, fuel pumps are employed.

Efforts to provide fuel vapor emission control systems on such small engines and particularly in the aforesaid applications of small engines have required additional components, modifications to the fuel tank and have resulted in significant increases in the cost of installing the engine and fuel system in the appliance. This is particularly the case where it is required to not only prevent fuel vapor emission during periods of engine shutdown but where it is also required to provide a valve which will close the tank make up air vent in the event of disorientation such as tipping or rollover of the appliance in service.

The more widely employed technique of preventing fuel vapor emission from a large engine tank and fuel system has employed a storage canister charged with adsorbent to retain the fuel vapors until the engine is started and the vapors can then be drawn into the engine air inlet and the canister purged by induction of atmospheric air as the vapors are drawn into the engine. Such systems have long been employed in large engines such as in motor vehicles with fuel tanks remote from the engine.

However, it has been found difficult and costly to provide these functions for small engines having fuel tanks which are typically bracket mounted on the engine or the appliance in a position adjacent the engine where it is necessary to keep the volume of the engine and tank to a minimum. This has been particularly difficult to achieve for air cool engines where the engine is closely cowled to provide adequate airflow over the cylinder head for proper cooling. In addition, most small engine applications employ gravity feed fuel tanks which are placed above the engine and thus require a particular configuration for the appliance into which the engine is installed, particularly where the engine is cowled. Thus it has been desired to find a way or means of providing the necessary functions for fuel vapor emission control on small engines, particularly those employing gravity feed fuel tanks without requiring complete retooling for the fuel tank and associated fuel system and tank mounting components.

SUMMARY

The present specification drawings and claims describe and illustrate exemplary embodiments which provide a solution to the above described problem and include a fuel vapor storage canister and attached vapor vent/tipping valve and pressure relief valve which are integrally formed in a common housing for convenient mounting adjacent the small engine fuel tank and maybe connected by the appropriate flexible conduits to the fuel tank and engine air inlet.

The integral combination described herein provides a compact simple to manufacture and relatively low cost unit which provides for control of fuel vapor emission during periods of engine shutdown and yet provides for purging of stored fuel vapor upon engine start up. In addition, protection against tipping and rollover is also provided. In one illustrated embodiment, the storage canister has attached thereto a float operated vapor vent/tipping valve with "head" or pressure relief valve preventing vapor escape until a predetermined vapor pressure is reached. In another embodiment illustrated, the pressure relief valve includes a vacuum relief valve disposed in the moveable valve member to enable make up air to be drawn into the fuel tank during engine operation or upon tank cooling and condensing of vapor during engine shutdown to prevent collapse of the fuel tank.

DETAILED DESCRIPTION

Figure 1:
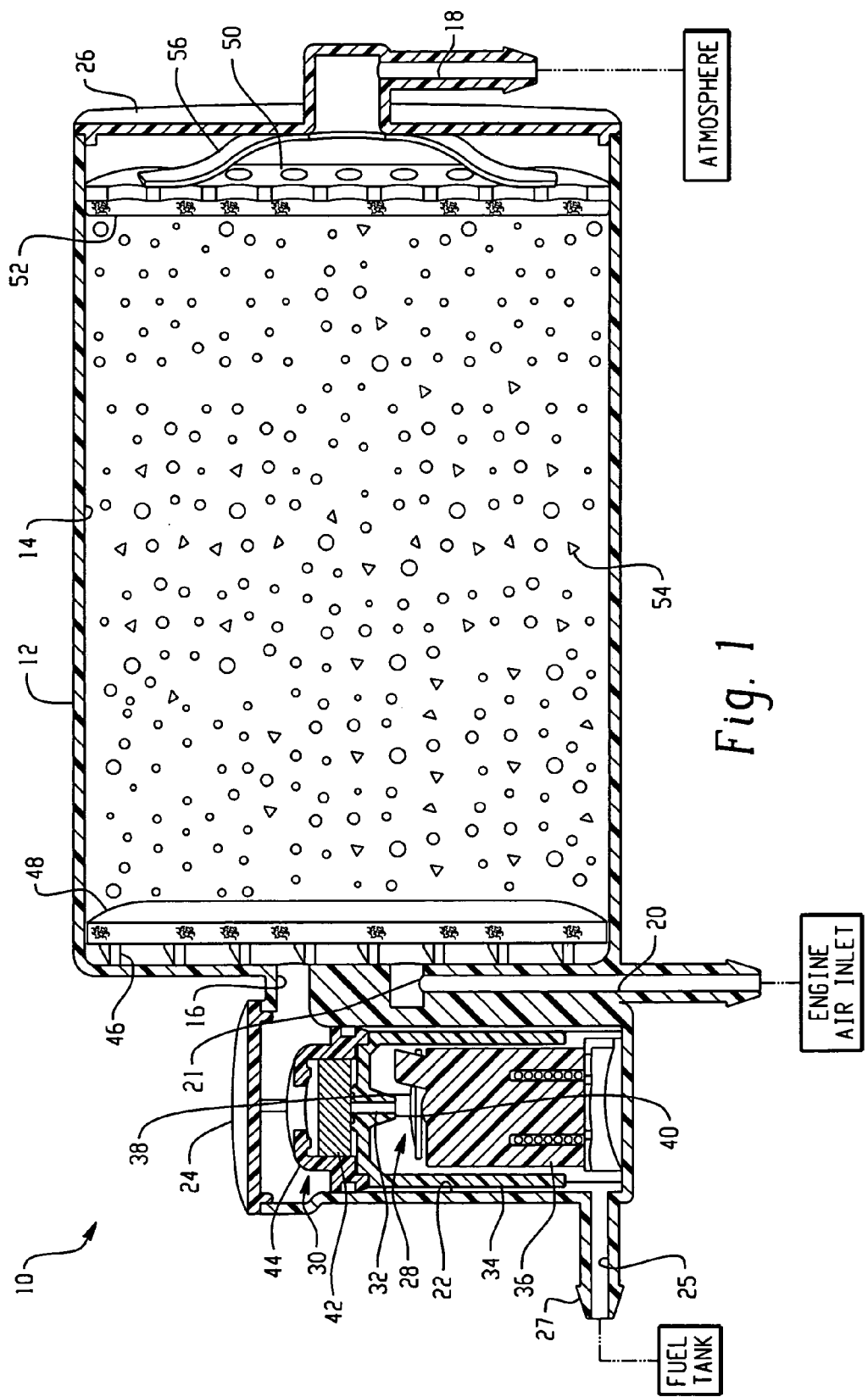
FIG. 1 is an isometric section view showing a float operated pressure relief valve integrally formed in a common housing with a vapor storage canister with the pressure relief valve in the closed position.

Referring to FIG. 1, an exemplary embodiment of the combination pressure relief valve/tipping valve and storage canister is indicated generally at 10 and includes a integrally formed common housing 12 defining a vapor storage chamber 14 with a vapor passage 16 formed in one end thereof and an atmospheric air vent 18 formed in the end distal the passage 16. The end into which passage 16 is formed also has a separate purge outlet passage 21 which communicates at right angles with a passage 20 formed therein which communicates externally of the housing 12 through a fitting 23. Fitting 23 is adapted for connection, as shown in dashed outline, to the original air inlet. Fuel vapor enters chamber 14 through passage 25 in fitting 27 adapted for connection to fuel tank as indicated in dashed line.

Housing 12 also has formed therein a vapor chamber 22 which maybe integrally formed in the common housing 12 with an open end.

Chamber 22 is closed by a cap 24 which may be secured and sealed thereon by any suitable expedient such as weldment. In a similar manner, chamber 14 may be formed with an end open and closed by a cap 26 sealed thereover as for example by weldment; and, the cap 26 may have integrally formed therein the atmospheric vent 18

The vapor chamber 22 has disposed therein a vapor vent/tipping valve indicated generally at 28 and a vapor pressure relief valve indicated generally at 30 which are disposed at opposite ends of a vapor vent 32 formed in a valve body 34 received in the vapor chamber 22

In the embodiment of FIG. 1, the vapor vent/tipping valve includes a float 36 with a flexible valve member 38 disposed on the upper surface thereof for closing against a valve seat 40 formed on the lower end of vapor vent 32. Upon fuel entering chamber 22 the float is caused to rise; and, upon the float reaching a predetermined level valve member 38 closes against valve seat 40 thereby preventing vapors from escaping the chamber 22. In addition to its buoyancy in liquid fuel, the float is gravitationally responsive to disorientation such as tipping or rollover for movement to close member 38 against valve seat 40.

A pressure relief valve indicated generally at 30 includes a valve member 42 disposed within the cover 44 attached to the valve body 34; and, member 42 is normally closed against the upper end of vent 32 under the influence of gravitational forces. The weight of valve number 42 is chosen such that the valve remains closed until a predetermined pressure is experienced in the fuel tank and vapor chamber 22 which pressure causes the valve member 42 to move upwardly thereby permitting vapor to escape through passage 16 to the storage canister 14.

The canister includes baffling surfaces 46 which provide a torturous path for vapor escaping from the canister through purge outlet passage 20 and may include filter material 48 disposed over the baffling surfaces 46.

In like manner, the atmospheric vent passage 18 in the distal end of the canister also has baffling surfaces disposed over the interior end of passage 18 and may also include filter material 52 for filtering air entering the storage chamber 14.

Storage chamber 14 may also include adsorbent material 54. Baffle 50 and filter 52 may be biased against the adsorbent material by a suitable spring 56. In the present practice, of the embodiment of FIG. 1, it has been found satisfactory to use particularate carbonaceous material such as granular charcoal for the adsorbent 54.

Figure 2:
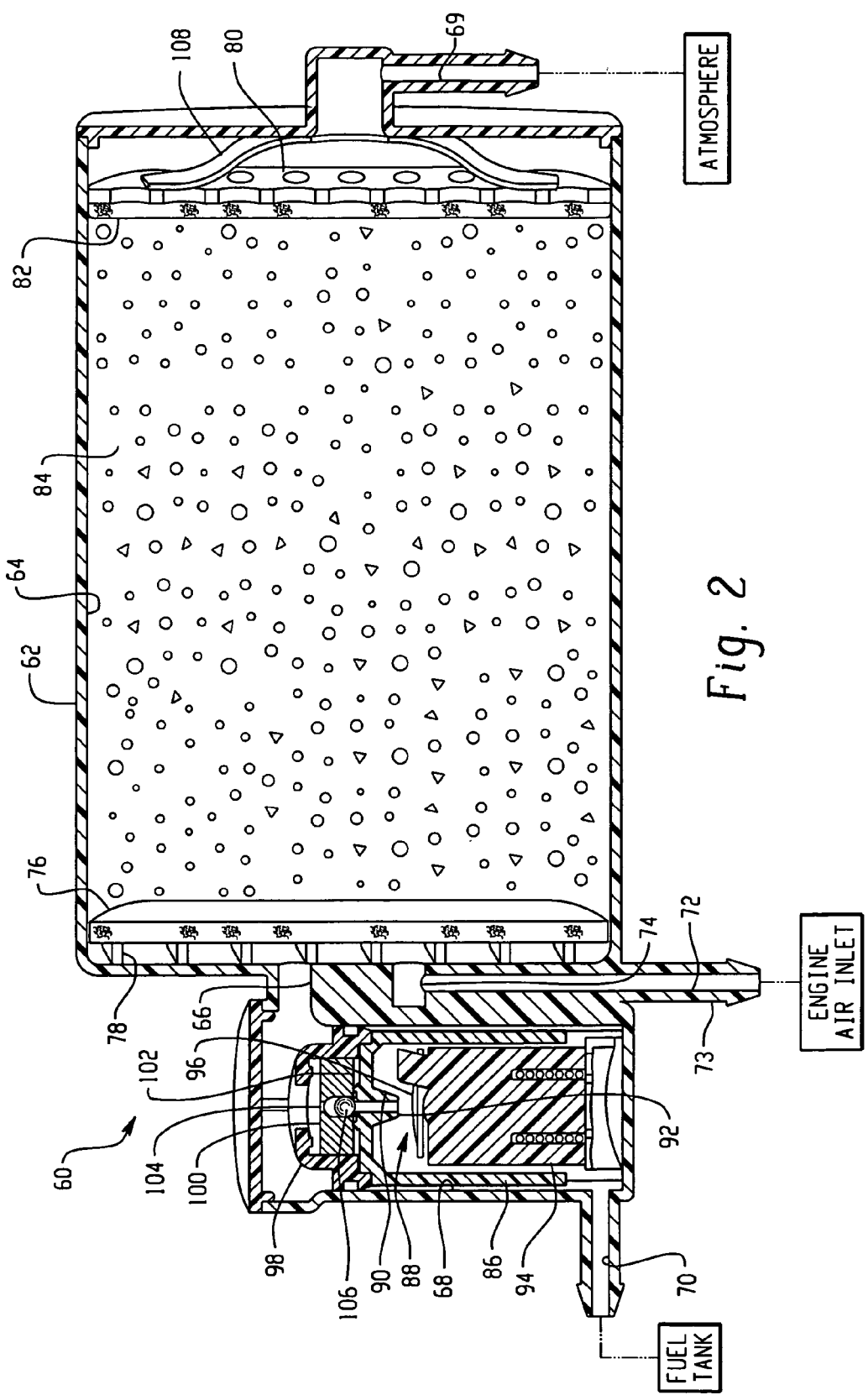
FIG. 2 is a view similar to FIG. 1 showing an alternative embodiment wherein the relief valve includes a vacuum pressure relief valve for admitting vapor and or air upon sub atmospheric pressure occurring in the fuel tank.

Referring to FIG. 2, another embodiment is illustrated generally at 60 and includes a common housing 62 defining a storage chamber 64 having a vapor passage 66 formed at an end thereof; and, the housing 62 has formed therein an atmospheric vent 69 at an end distal vapor passage 66. Housing 62 is formed as a common housing for a fluid of vapor chamber 68 which communicates with vapor passage 66 and has a fluid inlet 70 formed in fitting 71 which is adapted for connection thereto for receiving fuel vapor from a fuel tank as indicated by dashed line in FIG. 2. The common housing 62 also has formed therein a purge outlet passage 72 formed in fitting 73 which extends externally from the housing 62 and which is adapted for connection thereto for communicating with the engine air inlet as shown in dashed line Passage 72 also communicates openly through cross passage 74 with storage chamber 64.

As illustrated in the embodiment of FIG. 2, vapor flow from storage chamber 64 may be filtered by suitable filter material 76 and required to pass through a series of baffles 78 before reaching either purge outlet cross passage 74 or vapor passage 66 leading to chamber 68. In like manner, atmospheric air entering through passage 69 in the distal end of the housing 62 may be required to pass through a baffle 80 and a filter material 82 before entering chamber 64. As mentioned both with respect to the embodiment of FIG. 1 storage chamber 64 may also include adsorbent material 84 as, for example particulate carbonaceous material such as granular charcoal. If desired a spring 108 may be employed to bias the baffle 80 and filter 82 against the adsorbent 84.

Fluid chamber 68 has disposed therein valve body 86 which contains a vapor vent/tipping valve indicated generally at 88 which includes a vertically oriented vent passage 90 with a valve seat 92 formed on the lower end thereof; and, valve 88 may include a float 94 with a flexible valve member 96 disposed on the upper end thereof. Upon entry of liquid fuel through inlet 70 into chamber 68 and the interior of the valve body 86, the float rises; and, upon fuel level reaching a predetermined level, the float movement closes valve member 96 against valve seat 92 thus preventing escape of vapor through vent passage 90.

The valve body includes a cover 98 which retains a gravity operated pressure relief valve member 100 which, under the weight of the member, rests on valve seat 102 formed about the upper end of vent passage 90 for preventing escape of vapor air passage 90 until a predetermined pressure is reached in the fuel tank and fluid pressure chamber 68.

In the embodiment of FIG. 2, the gravity operated valve member 100 has a central passage 104 therethrough which has a valve seat formed on the lower end thereof with a movable valve member such as the sphere or ball 106 retained therein. A valve member 106 is formed of very light material, as for example, plastic having a relatively low specific gravity.

The slightest positive vapor pressure in the vent passage 90 causes ball 106 to move upward from the position shown in FIG. 2 in solid line to the position shown in dashed outline or against the valve seat formed on the lower end of passage 104. Valve member 106 serves as a vacuum relief valve upon the occurrence of a slight sub atmospheric pressure in chamber 68, in such event the valve member 106 is caused to drop from the valve seat at the lower end of passage 104 and permits vapor and/or air from storage canister 64 to flow through vapor passage 66 and through the vent passage 90 and passage 70 to the fuel tank. This opening of passage 90 thus provides a flow of make up air to prevent collapse of the fuel tank in response to withdrawal of liquid fuel during engine operation or in the event of cooling of the tank below ambient temperature to thereby generate a vacuum in the tank.

The current embodiments illustrated and described herein above thus present a vapor storage canister and vapor vent/tipping valve and pressure relief valve in a common housing with ports provided thereon for connection via conduits, such as hoses, to the engine fuel tank, engine air inlet and for atmospheric venting. These embodiments thus present a compact, simple and relatively low cost fuel vapor emission control system which may readily be added to existing small engines and their fuel tanks without costly modifications.

Although exemplary embodiments have been described and illustrated hereinabove, it will be understood that modifications and variations may be made by those skilled in the art within the scope of the following claims.

What is claimed is:

1. An integrated vapor vent/tipping valve and vapor storage assembly for use with a small engine fuel tank comprising:
   (a) a housing defining
      a vapor chamber with an inlet port for communication with the fuel tank and
      a storage chamber that communicates with the fluid receiving chamber through a vapor passage;
   (b) a pressure relief valve operable to permit vapor flow through the vapor passage to storage chamber when a predetermined pressure is reached in the vapor receiving chamber; and,
   (c) a tipping valve that blocks fuel from escaping the vapor chamber when the housing is tipped.

2. The assembly defined in claim 1, wherein the tipping valve includes a float that closes the tipping valve when fuel in the tank rises to a predetermined level.

3. The assembly defined in claim 1, wherein the pressure relief valve includes a vacuum relief valve operable to permit reverse flow when sub-atmospheric pressure occurs in the vapor chamber.

4. The assembly defined in claim 3, wherein the vacuum relief valve includes a spherical valve member.

5. The assembly defined in claim 3, wherein the pressure relief valve includes a gravity responsive member that is biased to the closed position.

6. The assembly defined in claim 1, wherein said storage chamber contains adsorbent material.

7. The assembly defined in claim 6, wherein the adsorbent material comprises carbonaceous particulate material.

8. The assembly defined in claim 1, wherein the vapor passage includes a baffling surface.

9. The assembly defined in claim 1, wherein the storage chamber and the vapor chamber are molded as a single piece.

10. The assembly defined in claim 8, wherein at least one of the storage chamber and the vapor chamber are molded as an open cavity and wherein the assembly further comprises at least one cap that closes at least one of the open cavities.

11. The assembly defined in claim 1, further comprising material disposed in the storage chamber to filter flow through the vapor passage.

12. A method of making an integrated vapor vent/tipping valve and vapor storage device for a small engine fuel tank comprising:
   (a) forming a housing having
      a vapor chamber with an inlet port that communicates with the fuel tank,
      a storage chamber that communicates with the vapor chamber through a vapor passage;
   (b) disposing a pressure relief valve in the vapor chamber, wherein the pressure relief valve prevents flow through the vapor passage until a predetermined pressure is reached in the vapor chamber; and,
   (c) disposing a tipping valve in the vapor chamber to block fuel from escaping the vapor chamber when the housing is tipped.

13. The method defined in claim 12, wherein the step of disposing the tipping valve includes disposing a float member that closes the tipping valve when fuel rises to a predetermined level in the tank.

14. The method defined in claim 12, wherein the step of integrally forming the housing includes forming the vapor chamber and the storage chamber together as a single piece.

15. The method of claim 14, wherein the step of integrally forming the housing includes molding at least one of the storage chamber and the vapor chamber as an open cavity, and wherein the method further comprises attaching at least one cap that closes at least one of the open cavities onto the housing.

16. The assembly of claim 1, wherein the storage chamber includes a purge outlet and an atmospheric vent.

17. The assembly defined in claim 16, wherein the storage chamber includes material for filtering flow through the purge outlet and the atmospheric vent.

18. The assembly defined in claim 16, wherein the purge outlet includes a baffling surface.

19. The assembly defined in claim 16, wherein the atmospheric vent includes a baffling surface.

* * * * *

UNITED STATES PATENT AND TRADEMARK OFFICE
CERTIFICATE OF CORRECTION

| | |
|---|---|
| PATENT NO. | : 7,249,595 B2 |
| APPLICATION NO. | : 11/081418 |
| DATED | : July 31, 2007 |
| INVENTOR(S) | : Vaughn K. Mills et al. |

It is certified that error appears in the above-identified patent and that said Letters Patent is hereby corrected as shown below:

Claim 1, column 4, line 56, delete "fluid receiving chamber" and insert --vapor chamber--.

Signed and Sealed this
Twelfth Day of April, 2011

David J. Kappos
*Director of the United States Patent and Trademark Office*